United States Patent

Kolibar et al.

[11] 3,907,448
[45] Sept. 23, 1975

[54] KNOB

[75] Inventors: Richard W. Kolibar, Parma; Robert F. Rupnik, Brooklyn, both of Ohio

[73] Assignee: Eaton Corporation, Cleveland, Ohio

[22] Filed: Feb. 19, 1974

[21] Appl. No.: 443,464

[52] U.S. Cl. .................... 403/361; 16/121; 74/553
[51] Int. Cl.² ............................................ F16D 1/06
[58] Field of Search .......... 403/361, 383, 375, 357; 16/121, 349; 279/102, 96; 339/256 R, 256 C, 59 R, 59 M; 74/553; 292/349, 353

[56] References Cited
UNITED STATES PATENTS

| | | | |
|---|---|---|---|
| 3,040,288 | 6/1962 | Edlen et al. ...................... | 339/256 X |
| 3,188,124 | 6/1965 | Pestka et al. ...................... | 403/383 |
| 3,498,650 | 3/1970 | Strange ............................. | 74/553 X |

FOREIGN PATENTS OR APPLICATIONS

| | | | |
|---|---|---|---|
| 510,214 | 7/1939 | United Kingdom................. | 279/102 |
| 993,316 | 5/1965 | United Kingdom............. | 339/256 R |
| 1,030,091 | 5/1966 | United Kingdom............. | 339/59 M |

*Primary Examiner*—Andrew V. Kundrat
*Attorney, Agent, or Firm*—Teagno & Toddy

[57] ABSTRACT

An improved control knob includes a manually engageable head portion and a tubular stem attached to a control shaft. During assembly, the control shaft is inserted into a longitudinally extending chamber formed in the stem. As the control shaft enters the stem, the leading end of the shaft engages an inclined surface disposed on a relatively thin portion of the outer wall of the stem. Continued insertion of the control shaft into the stem chamber presses the inclined surface radially outwardly to resiliently deflect the thin portion of the outer wall of the stem. The resiliently deflected thin portion of the outer stem wall presses the control shaft against the opposite side of the chamber to frictionally grip the control shaft and hold it against movement relative to the knob.

1 Claim, 4 Drawing Figures

US Patent  Sept. 23, 1975  3,907,448
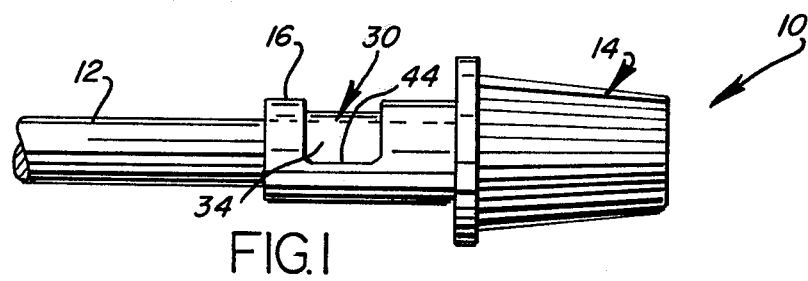
FIG. 1
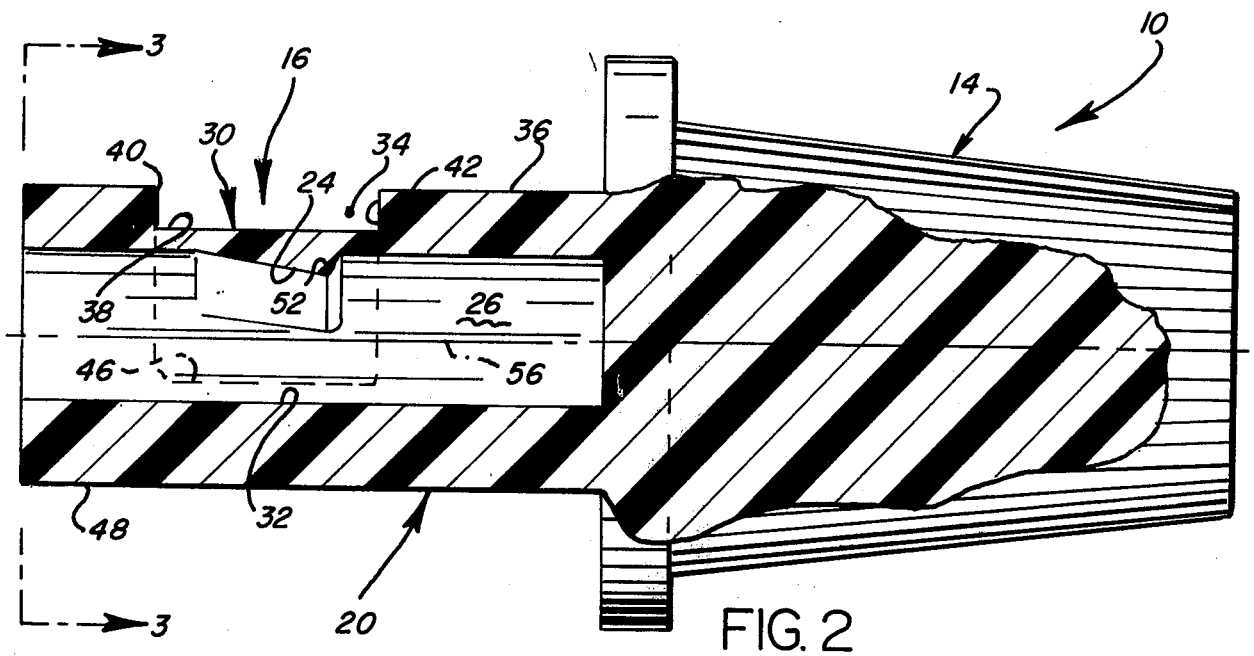
FIG. 2
FIG. 3
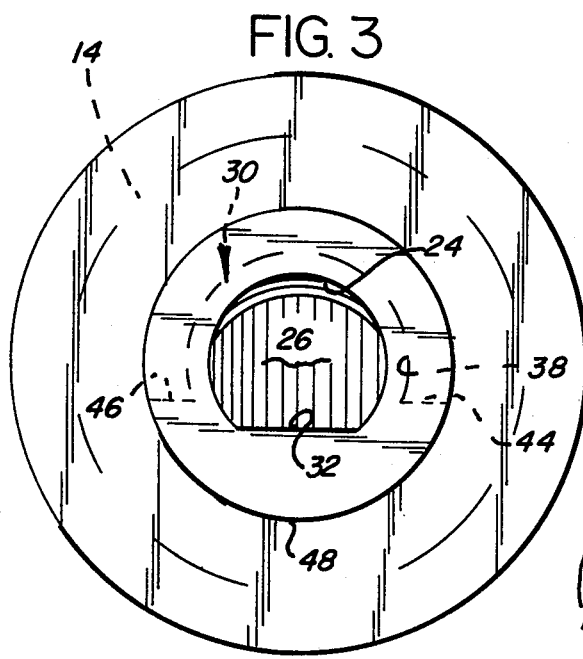
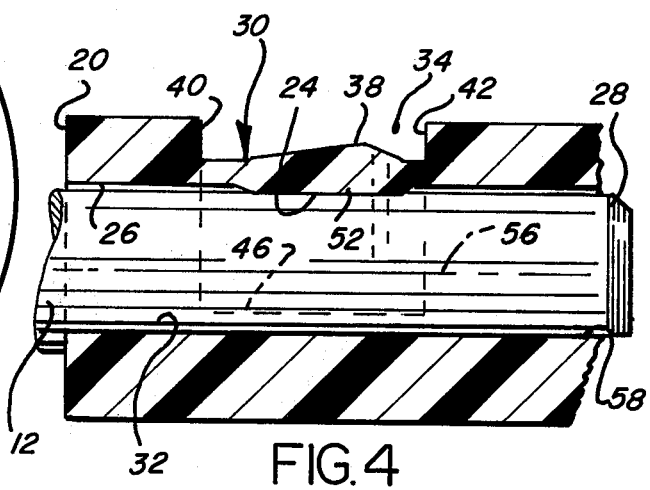
FIG. 4

KNOB

BACKGROUND OF THE INVENTION

The present invention relates to a new and improved knob, and more specifically to an integrally formed plastic knob which is utilized to turn a control shaft.

There are many known constructions which are utilized in association with control shafts. Some of these known knobs have a plastic body to which a spring steel clip is added to grip the control shaft. A knob having such a construction is disclosed in U.S. Pat. No. 1,951,188. In order to reduce construction costs and simplify assembly operations, other known control knobs have been integrally molded with resilient side walls or ribs which are utilized to grip the shaft. Some known control knobs of this construction are disclosed in U.S. Pat. Nos. 3,188,124 and 3,679,252. Although these known control knobs have been more or less satisfactory, it is believed that they do not provide an optimum combination of design characteristics from a cost, installation and operating standpoint.

SUMMARY OF THE PRESENT INVENTION

The present invention provides an integrally formed plastic knob having a manually engageable head portion and a tubular stem which is capable of gripping a control shaft without the use of steel clips or substantial modifications to the shaft. To provide a secure gripping action, the stem of the knob has an outer wall with a relatively thin portion which is resiliently deformed as the control shaft is inserted into a chamber in the stem. The resiliently deformed thin portion of the outer wall applies pressure against the knob to grip it between opposing surfaces of the stem chamber. To provide for resilient flexing of the outer wall of the control shaft is inserted, the stem has an inclined surface which projects into the chamber. This inclined surface is engaged by the control shaft to deflect the thin portion of the outer wall of the stem as the control shaft is inserted into the stem.

Accordingly, it is an object of this invention to provide a new and improved knob which is utilized in association with a control shaft and has an outer stem wall with a relatively thin portion which is resiliently deflected radially outwardly as the control shaft is inserted into the stem and which grips the control shaft to hold it against movement relative to the stem.

Another object of this invention is to provide a new and improved knob having a stem with a surface which is inclined in the direction of insertion of the shaft into the stem and which engages the shaft to hold it against movement relative to the stem.

BRIEF DESCRIPTION OF THE DRAWINGS

The foregoing and other objects and features of the present invention will become more apparent upon a consideration of the following description taken in connection with the accompanying drawings wherein:

FIG. 1 is an illustration of a control knob constructed in accordance with the present invention in association with a control shaft;

FIG. 2 is an enlarged fragmentary sectional view of the control knob of FIG. 1 and illustrating the construction of a stem portion of the knob;

FIG. 3 is an end view, taken generally along the line 3—3 of FIG. 2, further illustrating the construction of the stem portion of the knob; and FIG. 4 is a fragmentary sectional view illustrating the relationship between the stem portion of the knob of FIG. 2 and the control shaft.

DESCRIPTION OF ONE SPECIFIC PREFERRED EMBODIMENT OF THE INVENTION

A knob 10 constructed in accordance with the present invention is utilized to turn a control shaft 12. The knob 10 is formed of plastic and includes engageable head end portion 14 and a generally cylindrical stem 16 which is integrally molded with the head portion 14. The stem 16 has a tubular outer wall 20 (see FIG. 2).

When the knob 10 and shaft 12 are being assembled, the control shaft is inserted into a chamber 26 (FIG. 2) in the stem 16. As the control shaft 12 is telescopically inserted into the stem 16, a leading end portion 28 (FIG. 4) of the control shaft engages a forwardly inclined surface 24 to resiliently deflect a relatively thin outer portion 30 of the stem wall 20 radially outwardly. The resiliently deflected outer portion 30 of the stem wall 20 presses the control shaft 12 against an opposing side 32 of the chamber 26 to frictionally grip the control shaft and hold it against axial movement relative to the stem 16.

The force with which the resiliently deflected outer portion 30 of the stem wall 20 grips the control shaft 12 is at least partially determined by the redial thickness of the deflected wall portion. The deflected wall portion 30 is relatively thin in radial thickness due to the formation of an arcuate recess 34 in the relatively thick main wall portion 36 of the tubular stem wall 20. The recess 34 is defined by an arcuate inner surface 38 and a pair of radially extending side surfaces 40 and 42 on the thick main wall portion 36. A pair of axially extending end surfaces 44 and 46 (see FIGS. 1, 2 and 3) are also formed on the main wall portion 36 and extend perpendicular to the axially inner and outer end surfaces 40 and 42. The inner or bottom surface 38 of the recess 34 forms a portion of a cylinder which is disposed in a coaxial relationship with a cylindrical outer surface 48 of the tubular stem wall 20 (see FIG. 3).

The shallower the recess 34, the greater is the radial thickness of the resiliently deflectable thin portion 30 of the stem wall 20. The greater the radial thickness of the resiliently deflectable stem wall portion 30, the greater the force which is required to deflect it outwardly as the control shaft 28 is inserted into the chamber 26. Of course, the greater the force required to deflect the thin portion 30 of the stem wall outwardly, the greater is the force with which the natural resiliency of the plastic material of the wall presses the deflected portion of the stem wall inwardly against the control shaft 28. Therefore it is desired to increase the frictional force with which the control shaft 12 is gripped, it is merely necessary to increase the thickness of the resiliently deflectable portion 30 of the stem wall. If it is desired to decrease the frictional force with which the control shaft 12 is gripped, it is merely necessary to decrease the thickness of the portion 30 of the stem wall.

The force with which the control shaft 12 is gripped can also be varied by varying the distance by which the inclined surface 24 projects into the chamber 26. The surface 24 is formed on a generally arcuate rib 52 having a wedge-shaped configuration. The rib 52 is integrally formed with the relatively thin portion 30 of the stem wall 20.

As the leading end 28 of the control shaft 12 is inserted into the chamber 26, it moves into engagement with the forwardly and inwardly inclined surface 24. To move the control shaft 12 further into the chamber 26, it is necessary to deflect the portion 30 of the stem wall 20 to an extent sufficient to enable the shaft to move past the rib 52. As this occurs, the rib 52 deflects the relatively thin portion 30 of the stem wall outwardly about an axis extending perpendicular to a longitudinal central axis 56 (see FIG. 2) of the stem 20. Of course the greater the distance which the rib 52 projects into the chamber 26, the greater the distance through which the thin wall portion 30 must be resiliently deflected outwardly and the greater the gripping force which the wall portion 30 will exert against the control stem 12.

When the control stem 12 has been inserted into the chamber 26, the resiliently deflected thin wall portion 30 presses the rib 52 against the outer surface of the control rod 12. This force presses a flat side surface 58 of the control rod 12 against the longitudinally extending flat side surface 32 of the chamber 26 (see FIGS. 3 and 4). The flat surface 32 of the chamber 26 and the flat surface 58 on the control rod 12 cooperate to prevent rotational movement of the control rod about the central axis 56 when the knob 10 is manually rotated. In view of the foregoing description, it can be seen that the knob 10 is integrally molded of a plastic material. The knob includes a stem having a relatively thin outer wall portion 30 which is resiliently deflected radially outwardly as a control shaft is inserted into an axially extending chamber or cavity formed in the stem. The portion 30 of the outer wall 20 of the stem 16 is deflected radially outwardly by engagement of the leading end 28 of the control shaft with the inclined surface 24.

Since the knob 10 is integrally formed of a molded plastic construction, its installation on the control shaft 12 is relatively simple. In addition, it should be noted that the control shaft 12 has a more or less standard configuration and does not have to be given a special configuration to cooperate with the knob.

Having described one specific preferred embodiment of the invention, the following is claimed:

1. A one-piece, molded knob for use in turning a control shaft having a leading end of generally "D" shaped cross-section comprising a generally flat outer surface and a generally arcuate outer surface, said knob comprising a manually engageable head portion and a tubular stem integrally formed with and projecting outwardly from said head portion, said stem comprising an outer stem wall which at least partially defines a longitudinally extending chamber for receiving a portion of the leading edge of the control shaft, said chamber being of a generally D shaped cross-section being defined by a generally flat inner surface and a generally arcuate inner surface, retainer means integral with said outer stem wall for retaining the control shaft in said chamber, said retainer means comprising surface means extending from said arcuate inner surface and inclined in the direction of insertion of the shaft into said chamber, said retainer means located in a position for engagement with the leading end of the control shaft for resiliently deflecting a portion of said outer stem wall radially outwardly as the control shaft is inserted into said chamber and for pressing the control shaft against a longitudinally extending inner surface of said chamber under the influence of the resiliently deflected portion of said outer stem wall, said outer stem wall adjacent to said retainer means being recessed and relatively thinner than the adjacent portions of said outer stem wall.

* * * * *